United States Patent [19]
Pomrink et al.

[11] Patent Number: 5,788,885
[45] Date of Patent: Aug. 4, 1998

[54] STABILIZATION OF MAGNESIUM HYDROXIDE SLURRIES

[75] Inventors: Gregory J. Pomrink, Wyncote; Bruce K. Fillipo, Dublin, both of Pa.

[73] Assignee: BetzDearborn Inc., Trevose, Pa.

[21] Appl. No.: 820,426

[22] Filed: Mar. 12, 1997

Related U.S. Application Data

[62] Division of Ser. No. 587,442, Jan. 17, 1996, Pat. No. 5,624,568.

[51] Int. Cl.$^6$ .............................. B01F 17/00; B01F 17/10
[52] U.S. Cl. .................. 252/354; 252/313.1; 423/636; 44/640; 106/14.14
[58] Field of Search ................. 252/313.1, 354; 423/636; 44/640; 106/14.14

[56] References Cited

U.S. PATENT DOCUMENTS

| | | | |
|---|---|---|---|
| 3,957,674 | 5/1976 | Sano et al. | 252/313.1 |
| 4,117,116 | 9/1978 | Buehler et al. | 424/690 |
| 4,156,594 | 5/1979 | Tarpley, Jr. | 252/315.3 |
| 4,298,497 | 11/1981 | Colombo | 106/14.05 |
| 4,412,844 | 11/1983 | Collins et al. | 44/301 |
| 4,561,897 | 12/1985 | Zupanovich et al. | 106/14.14 |
| 4,743,396 | 5/1988 | Fong et al. | 252/313.1 |
| 5,143,965 | 9/1992 | Mertz | 423/636 |
| 5,182,343 | 1/1993 | Ono et al. | 526/240 |
| 5,514,357 | 5/1996 | Richmond et al. | 252/313.1 |

*Primary Examiner*—Richard D. Lovering
*Assistant Examiner*—Daniel S. Metzmaier
*Attorney, Agent, or Firm*—Alexander D. Ricci; Richard A. Paikoff

[57] ABSTRACT

A treatment for reducing viscosity and inhibiting settling of an aqueous 30% or higher by weight magnesium hydroxide slurry which comprises adding to the slurry an amount, effective for the purpose of a combination of an alkyl sulfosuccinate surfactant, an alkylaryl sulfonate surfactant, a xanthan gum and a clay, and optionally a water soluble polycarboxylate.

3 Claims, No Drawings

STABILIZATION OF MAGNESIUM HYDROXIDE SLURRIES

This is a divisional of application Ser. No. 08/587,442 filed Jan. 17, 1996, now U.S. Pat. No. 5,624,568.

BACKGROUND OF THE INVENTION

In the production of magnesium from sea water, one of the processing steps produces a 30% or higher by weight magnesium hydroxide slurry. These slurries are unstable and rapidly separate or have a paste consistency and are very difficult to pump or flow through pipes due to their high viscosity. This general technology is described in the Kirk-Othmer Encyclopedia of Chemical Technology, Third Edition, vol. 14 (1981), p. 634–635.

As noted, magnesium hydroxide slurries with a greater than about 30% weight magnesium hydroxide exhibit rapid viscosity increase and heavy settling, and are by nature extremely difficult to transport. One purpose for these materials involves feeding the slurry to boiler fuel oil prior to ignition, in order to produce a softer scale that is easier to remove from the boiler. Consequently, the formation of a softer, more compressible scale prevents damage to the boiler tubes which occurs because of differences in thermal expansion coefficients between the boiler tubes and the deposit. Also, the feedlines bringing the slurry to the furnace can often become clogged due to settling of the magnesium hydroxide during the application. Therefore, a need arises to stabilize the slurry in order to make it pumpable, and also to prevent settling and clogging of feedlines.

DETAILED DESCRIPTION OF THE INVENTION

The present invention relates to a method for reducing viscosity and inhibiting magnesium hydroxide settling of an aqueous slurry with greater than 30 wt. % magnesium hydroxide. The slurry is stabilized by a treatment comprising an alkyl sulfosuccinate surfactant, a water soluble polycarboxylate, and a rheology modifier (e.g., xanthan gum or magnesium aluminum silicate clay). Preferred sulfosuccinate surfactants include sodium diisooctyl sulfosuccinate and a dicarboxyethyl-n-octa- decylsulfosuccinate, tetrasodium salt.

In a preferred embodiment of the present invention, samples for evaluation were prepared by dispersing the xanthan gum and clay in water, followed by addition of the anionic surfactants, polymer and mag- nesium hydroxide slurry. All samples were then evaluated for viscosity and stability (from 4°–50° C.).

The following results, as shown in Table I below, indicate that the unstabilized magnesium hydroxide slurry (control) completely separated and hard settled within 48 hours, and exhibited viscosities greater than 50,000 centipoises, or cps. Two particularly preferred embodiments of the present invention (Samples B and D) did not exhibit rapid settling, and viscosities remained low (less than 1200 cps) throughout the test period.

Preferred amounts of additives which effectively stabilize the magnesium hydroxide slurry (not necessarily in combination) are about 0.05 to 0.2% xanthan gum, about 0.05–0.30% clay, about 0.1–2.0% alkylaryl sulfonate surfactant (sodium dodecylbenzene sulfonate, or DDBSA), about 0.5–5.0% dicarboxyethyl-n-octadecyl sulfosuccinate, tetrasodium salt (DCEODS), about 0.5–5.0% diisooctyl sulfosuccinate (DOSS), and about 0.5–5.0% polyacrylic acid (PAA), the polyacrylic acid with a molecular weight of from 1000–5000. The magnesium hydroxide slurries tested are all commercially available.

TABLE I

Stabilization of Aqueous Magnesium Hydroxide Slurries (70 Wt. %)*

| Material (wt. %) | Control | Sample A | Sample B | Sample C | Sample D |
|---|---|---|---|---|---|
| Water | 30.0 | 23.2 | 23.2 | 24.0 | 19.4 |
| DOSS |  | 1.8 | 1.8 | 1.8 | 1.8 |
| Clay |  | 0.2 | 0.2 | 0.2 | 0.2 |
| Xanthan Gum |  | 0.1 | 0.1 | 0.1 | 0.1 |
| DCEODS |  |  | 3.8 | 3.8 | 3.8 |
| PM |  | 3.8 |  |  | 3.8 |
| DDBSA |  | 0.8 | 0.8 | 0.8 |  |
| Physical Properties |  |  |  |  |  |
| pH | 9.8 | 9.8 | 10.1 | 99 | 9.9 |
| Viscosities CPS @ 25° C. |  |  |  |  |  |
| Initial | 1460 | 1120 | 600 | 600 | 600 |
| 7 days | >8000 | 3440 | 680 | 640 | 640 |
| 15 days | >8000 | 5560 | 860 | 640 | 600 |
| 30 days | >8000 | >8000 | 980 | 800 | 600 |
| Stabilities (4° C.) |  |  |  |  |  |
| 7 days (% separated (sep)/% sludged) | 50/100 | 0/0 | 0/1 | 0/0 | 0/0 |
| 15 days (% sep/% sludged) | 50/100 | 2/0 | 2/2 | 2/5 | 0/0 |
| 30 days (% sep/% sludged) | 50/100 | 5/0 | 5/2 | 10/15 | 1/0 |
| Stabilities (50° C.) |  |  |  |  |  |
| 7 days (% sep/% sludged) | 50/100 | 2/0 | 1/2 | 0/0 | 0/0 |
| 15 days (% sep/% sludged) | 50/100 | 5/0 | 2/2 | 2/5 | 2/0 |
| 30 days (% sep/% sludged) | 50/100 | 5/15 | 5/5 | 10/15 | 5/2 |

*Silicone oil-based antifoam added to treatments.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A composition for reducing viscosity and inhibiting settling of an aqueous 30% or higher by weight magnesium hydroxide slurry which comprises a combination of a dicarboxyethyl-n-octadecyl sulfosuccinate surfactant, an alkylaryl sulfonate surfactant, a xanthan gum and a clay.

2. The composition according to claim 1 wherein the combination further comprises diisooctyl sulfosuccinate.

3. The composition according to claim 1 wherein the combination further comprises polyacrylic acid having a molecular weight of from 1000–5000.

* * * * *

UNITED STATES PATENT AND TRADEMARK OFFICE
CERTIFICATE OF CORRECTION

PATENT NO.  : 5,788,885
DATED       : August 4, 1998
INVENTOR(S) : Pomrink et al.

It is certified that error appears in the above-identified patent and that said Letters Patent is hereby corrected as shown below:

In Column 2, Table I, please amend as follows:

Please amend the 6th item listed under the Material (wt.%) column from "PM" to ---PAA---.

Please amend the pH of Sample C from "99" to ---9.9---.

Signed and Sealed this

Ninth Day of February, 1999

Attest:

Attesting Officer

*Acting Commissioner of Patents and Trademarks*